United States Patent [19]

(12) United States Patent
Bonin et al.

(10) Patent No.: US 8,004,796 B2
(45) Date of Patent: Aug. 23, 2011

(54) SLIDER WITH CONTACT FEATURES INITIATED AT WAFER LEVEL

(75) Inventors: Wayne Allen Bonin, North Oaks, MN (US); John L. Brand, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 867 days.

(21) Appl. No.: 11/842,552

(22) Filed: Aug. 21, 2007

(65) Prior Publication Data

US 2009/0052084 A1 Feb. 26, 2009

(51) Int. Cl.
*G11B 21/21* (2006.01)
*G11B 17/32* (2006.01)
*G11B 5/60* (2006.01)

(52) U.S. Cl. .................................................. 360/235.1
(58) Field of Classification Search .... 360/235.1–235.9, 360/236, 236.1–236.9, 237, 237.1
See application file for complete search history.

(56) References Cited

U.S. PATENT DOCUMENTS

| 6,443,813 | B1 | 9/2002 | Strom et al. ................. 451/41 |
| 6,532,134 | B1 | 3/2003 | Chen et al. ................. 360/235.2 |
| 6,654,206 | B2 | 11/2003 | Hipwell et al. ............ 360/236.6 |
| 6,799,365 | B2 | 10/2004 | Boutaghou ................ 29/603.12 |
| 6,989,965 | B2 | 1/2006 | Mundt et al. .............. 360/235.4 |
| 6,995,952 | B2 | 2/2006 | Feliss et al. .............. 360/235.3 |
| 2001/0030835 | A1* | 10/2001 | Hipwell et al. ............ 360/237 |
| 2003/0156346 | A1* | 8/2003 | Suzuki et al. .............. 360/75 |

* cited by examiner

*Primary Examiner* — Craig A. Renner
*Assistant Examiner* — Gustavo Polo
(74) *Attorney, Agent, or Firm* — John D. Veldhuis-Kroeze; Westman, Champlin & Kelly, P.A.

(57) ABSTRACT

A method is disclosed for producing sliders with protective contacts features the fabrication of which is initiated at the wafer level. Recesses are formed in the wafer, a protective material is provided in the recesses, and the wafer is sliced along the recesses and diced into sliders, such that the protective material forms corners of the sliders. The protective material may be disposed such that it has a low elastic modulus at the corners, and a higher elastic modulus at a displacement from the corners which is still lower than the elastic modulus of the slider body, thereby providing superior protection for potential contacts between the slider and an adjacent media surface.

19 Claims, 5 Drawing Sheets

SLIDER WITH CONTACT FEATURES INITIATED AT WAFER LEVEL

BACKGROUND OF THE DISCLOSURE

Data storage systems use magnetic, optical, or other media for storage of digital information. For example, typical disc drives use rigid or flexible discs coated with a magnetizable medium for storing information in a plurality of circular, concentric data tracks. The discs are mounted on a spindle motor which causes the discs to spin and the surfaces of the discs to pass under respective hydrodynamic (e.g., air) bearing disc head sliders. The sliders carry transducers, which write information to and/or read information from the disc surface. An actuator mechanism moves the sliders from track to track across the surfaces of the discs under control of electronic circuitry. The actuator mechanism includes a suspension for each slider. The suspension includes a load beam and a gimbal. The load beam provides a load force, which forces the slider toward the disc surface. The gimbal is positioned between the slider and the load beam, or is integrated in the load beam, to provide a resilient connection that allows the slider to pitch and roll while following the topography of the disc.

The slider includes a slider body having a bearing surface, such as an air bearing surface or other hydrodynamic bearing surface, which faces the disc surface. As the disc rotates, the air pressure between the disc and the air bearing surface increases and creates a hydrodynamic lifting force, which causes the slider to lift and fly above the disc surface. The preload force supplied by the load beam counteracts the hydrodynamic lifting force. The preload force and the hydrodynamic lifting force reach an equilibrium, which determines the flying height of the slider relative to the disc surface.

The reliable operation of data storage devices is a top priority, and has been a persistent challenge as the elements of data storage have grown progressively smaller. For example, the advent of perpendicular magnetic recording has enabled greater density of data per unit area of a magnetic recording media surface, compared to longitudinal magnetic recording. There are many other examples in which progressively superior storage mechanisms involve progressively smaller sizes of the structures associated with the data storage, as well as progressively higher component speeds and progressively closer proximity of the components, including sliders and media surfaces. Both the higher speeds and the closer proximity raise the potential danger from unwanted or harmful contact events or a greater contact than is desired between a slider and an adjacent media surface.

This danger is also compounded in the ever-increasing usage of data storage devices in mobile settings rather than stationary contexts, such that devices that include data storage systems are much more frequently subject to being dropped, agitated, and other events that may cause shock impacts within the data storage system. Both sliders and media surfaces tend to be composed of hard materials, and any unintended impact contacts between them carry the danger of collisions that may damage either or both of these components, and not only interrupt performance at the time of impact, but also potentially corrupt the operation of the slider, gouge the media surface, destroy data tracks in the media surface, and generally degrade future performance of the data storage system. Efforts have been made to try to protect against the danger from unwanted contacts between the slider and the media surface, although such steps have added complexity and expense to the production of sliders and other components.

The present disclosure provides solutions to these and other problems and offers other advantages over the prior art. The discussion above is merely provided for general background information and is not intended to be used as an aid in determining the scope of the claimed subject matter.

SUMMARY

One illustrative aspect of the present disclosure is directed to a slider that includes a slider body and a protective layer. The protective layer is disposed on a portion of the slider body that includes at least one corner of the slider body. The protective layer has a first elastic modulus at the at least one corner, and a second elastic modulus at a position displaced from the at least one corner. The second elastic modulus is higher than the first elastic modulus.

DETAILED DESCRIPTION OF ILLUSTRATIVE EXAMPLES

Sliders and methods for producing such sliders are disclosed below according to a number of illustrative examples from among a wide range of various devices and methods with which the sliders of the present disclosure and their production may be embodied. While certain illustrative sliders and methods for producing them are described below and depicted in the accompanying figures, they are intended not to indicate any limitations to the variety of configurations, but rather to provide illustrative examples of the variety and broader meaning encompassed by the claims provided below.

Figure 1:
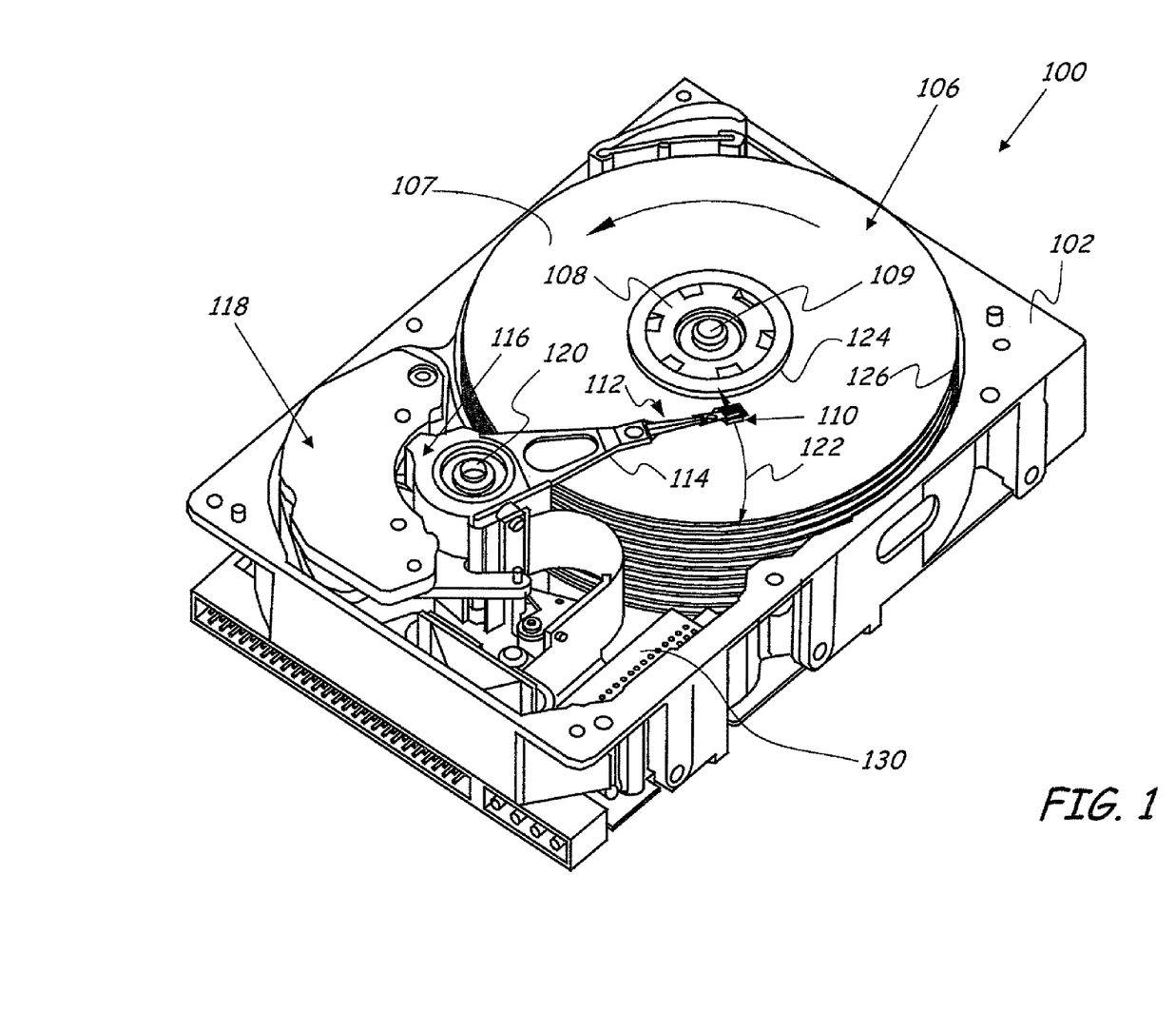
FIG. 1 depicts a perspective view of a data storage device, in accordance with one illustrative example.

FIG. 1 depicts a perspective view of a data storage device 100, as an illustrative example of a data storage system which incorporates a slider with the protective features of the present disclosure, thereby achieving improvements in terms of reliability and performance over an otherwise similar data storage system, for example. Data storage device 100 may be configured as a traditional magnetic disc drive, a magneto-optical disc drive or an optical disc drive, for example. A slider with wafer-level-initiated protective features may also be advantageously applied to a wide variety of other types of systems in which a component operates at close proximity to an adjacent surface with high relative speeds between the component and the adjacent surface; any such component may be considered a slider in the context of the present disclosure and may benefit from the features and aspects disclosed herein.

Data storage device 100 includes a housing with a base 102 and a top cover (not depicted in FIG. 1). Data storage device 100 further includes a disc stack 106, which is mounted on a spindle motor (not depicted in FIG. 1) by a disc clamp 108. Disc stack 106 includes a plurality of individual discs 107, which are mounted for co-rotation about central axis 109.

Each disc surface has an associated slider 110, which is mounted to data storage device 100 and carries a read and/or write head for reading data from and/or writing data to the respective disc surface.

In the example depicted in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 130. Other types of actuators can also be used, such as linear actuators, for example.

During operation, as discs 107 rotate, the discs drag air (or other fluid) under the respective sliders 110 and along their bearing surfaces in a direction approximately parallel to the tangential velocity of the discs. As the air (or other fluid) passes beneath the bearing surfaces, fluid compression along the flow path causes the fluid pressure between the discs and the bearing surfaces to increase, which creates a hydrodynamic lifting force that counteracts the load force provided by suspensions 112 and causes the sliders 110 to lift and fly above or in close proximity to the disc surfaces. In other examples such as in contact recording, the bearing surfaces remain in contact with the disc surfaces.

Figure 2:
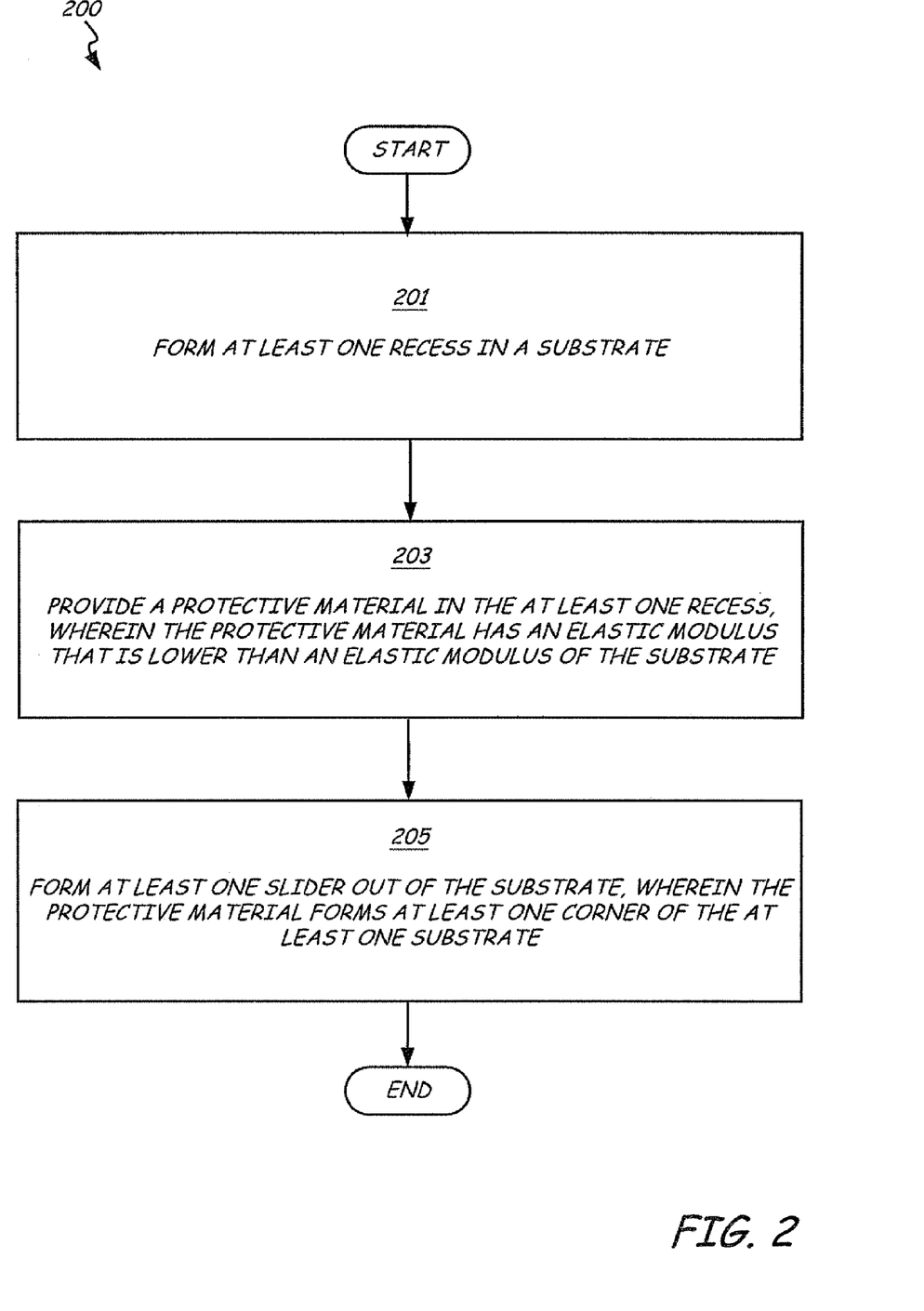
FIG. 2 depicts a flowchart for a method of producing at least one slider, in accordance with one illustrative example.

FIG. 2 depicts a flowchart for a method 200 for fabricating sliders beginning from a wafer, and with fabrication of protective features for the slider initiated at the wafer level of fabrication. Some aspects of method 200 are also clarified below with reference to the subsequent figures, which depict illustrative examples of the materials and devices described with reference to FIG. 2. Method 200 includes step 201, of forming at least one recess in a substrate, which may for example include forming a series of parallel grooves on one or both faces of a wafer. Such grooves may be formed by a cutting or abrasion tool, by etching, or by another process for removal and/or deposition of material, for example, and may be formed with a concave curving cross-section, or a triangular, rectangular, elliptical, circular, or other cross-section in different potential configurations. The concave cross-section may provide a desirable configuration of protective material, particularly in that it is simple and easy to form, while it may also provide a differential distribution in the orientation of the protective material from the corner to adjacent positions, for example, as is described further below.

Method 200 further includes step 203, of providing a protective material in the at least one recess, such as by depositing a protective layer on the grooved wafer, wherein the protective material has an elastic modulus that is lower than an elastic modulus of the substrate. For example, in one illustrative example, the wafer substrate may be composed of an alumina titanium carbon composite such as $Al_2O_3TiC$ (i.e. "AlTiC"), which may have an elastic modulus of approximately 390 gigapascals, for example, and the protective material may have an elastic modulus that is a low fraction of that. For example, the protective material may include or be composed of pyrolytic carbon, plastic or another polymer, a sputtered oxide such as amorphous alumina or amorphous silica, or a ceramic, among other possible options. Various of these options may provide an elastic modulus that is 20 to 25 gigapascals or lower, for example, more than an order of magnitude lower than that of the substrate. The protective material may be deposited on one or both faces of the wafer. After the protective layer is deposited, a portion of it may be selectively removed, in some examples.

Method 200 further includes step 205, of forming at least one slider out of the substrate, wherein the protective material forms at least one corner of the at least one slider. For example, this may include slicing a wafer along one or more of the grooves to render the wafer into a plurality of bars, and then dicing one or more of the bars to render the bars into a plurality of sliders. This may be done in such a way that the protective layer is disposed on one or more corners, and potentially also on one or more edges, of one or more of the sliders. That is, for example, if the wafer is sliced through approximately the middle of a groove, as opposed to on one side of a groove, the protective material on either side of the groove may be disposed on positions that become corners of opposing sliders so that the sliders have protective material on both of two laterally separated corners. Additionally, if the protective material is added to both sides of the wafer, then it may be disposed on positions that after the slicing and dicing form the longitudinally separated corners of the resulting sliders. In other examples, the sliders may be initially formed with protective material on a plurality of corners but have it removed from one or more corners in subsequent processing steps, for example. Method 200 therefore includes production of a wide variety of configurations of sliders from the original substrate, according to various different variations in which the method 200 may be performed.

Figure 3:
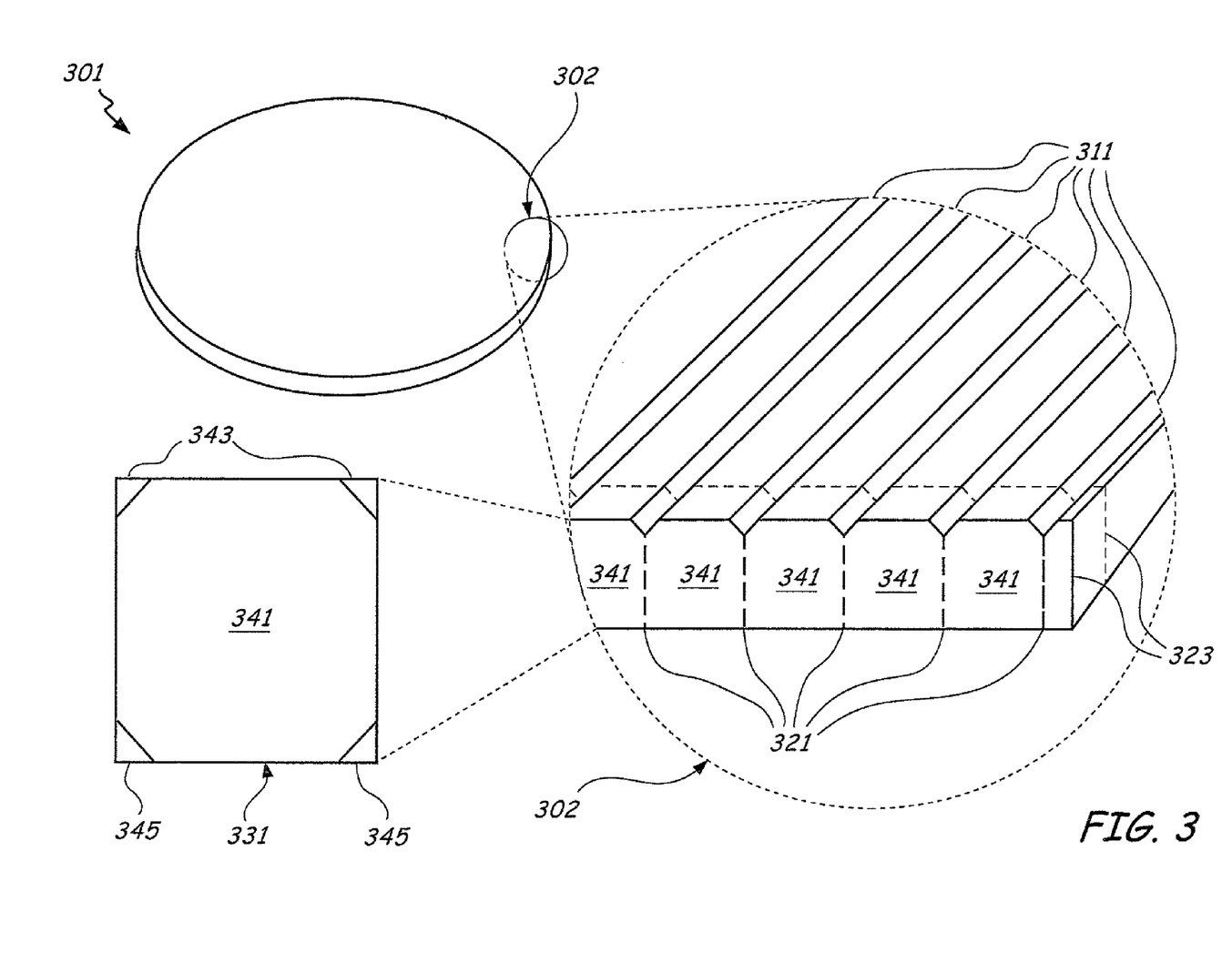
FIG. 3 depicts a perspective view of a wafer being processed to produce a plurality of sliders, in accordance with one illustrative example.

FIG. 3 depicts wafer 301, which may be processed to form into a large number of sliders, in this illustrative example. For example, wafer 301 may be sliced to render the wafer into a plurality of bars, and each of the bars may be diced to render the bars into a plurality of sliders, as is further elaborated below, according to one illustrative example. In one exemplary instance, wafer 301 may be sliced into many tens or hundreds of bars, and each of the bars may be diced into many tens or hundreds of sliders, thereby producing thousands or more sliders from each wafer 301. This may include tens or hundreds of thousands of sliders, or more, per wafer. A variety of processes may be used in broad compatibility with this example, and researchers are actively working to increase the precision and reduce the characteristic component sizes of the sliders, and it is envisioned that different examples of the present disclosure may be used in producing an increasingly large number of sliders per wafer.

Cross-sectional area 302 provides a detailed look at a small area of wafer 301 at an intermediate processing stage, to illustrate certain aspects of processing the wafer 301 as part of forming the wafer into multiple sliders. Cross-sectional area 302 is provided as a separate, much larger, exploded view of a small area of wafer 301, in which certain detailed aspects may be illustrated. These include a plurality of grooves 311 that are formed in wafer 301, in a parallel pattern across the top face of wafer 301 in this illustrative example. Grooves may also be formed in wafer 301 in a variety of other configurations not particularly depicted in cross-sectional area 302, such as an additional set of grooves formed perpendicular to the first set, grooves formed on the opposite face of wafer 301, and other variations. As depicted in the view of cross-sectional area 302, grooves 311 are formed on a face of wafer 301 that will form the leading edges of sliders formed therefrom, though grooves may be formed on an opposing wafer face corresponding to the trailing edges of sliders formed therefrom, or on both faces of the wafer corresponding to both the leading and trailing edges of the sliders, for example. A protective layer (not depicted in cross-sectional area 302) may then be deposited on the top and/or bottom face of wafer 301, such that the protective layer may partially or completely fill the volume of grooves 311 along with the remaining area of the face of the wafer, such that the protective layer is deposited with a greater thickness over the grooves.

Wafer 301 may be sliced along the cutting paths 321, which coincide along the wafer face with grooves 301 in this illustrative example, to render wafer 301 into bars. The bars may also be diced along cutting paths 323, perpendicular to cutting paths 321, to render the bars into individual slider bodies 341, depicted in cross-sectional area 302 as regions of wafer 301 still incorporated in the wafer, though intended to be subsequently diced into individual sliders. The cross-sectional view 302 is depicted along the forward cutting path 323, although it is contemplated that the cuts may be made along cutting paths 321 that coincide with grooves 311 prior to making the cuts along cutting paths 323 in this example, though any other order of cuts may be made in a variety of different examples.

FIG. 3 also provides an exploded close-up view of one of slider bodies 341 after it has undergone further processing stages. These may include the formation of additional grooves on the opposing face of wafer 301, depositing protective layers on both wafer faces, removing the protective layers from the wafer faces above the level of the grooves, and slicing and dicing wafer 301 to form sliders including illustrative individual slider 331, in accordance with one illustrative example. Slider 331 includes slider body 341 formed from wafer 301, along with protective layers 343 disposed on the top corners thereof and protective layers 345 disposed on the bottom corners thereof, where the top corners correspond to the leading edge of slider 331 and the bottom corners correspond to the trailing edge of slider 331, in this illustrative example. The protective layers 343 disposed on the top corners of slider 331 may be formed from the protective material deposited on wafer 301 that fills grooves 311, with each of the front corners corresponding to one half of adjacent grooves in the original wafer. The protective layer may be further processed on the wafer after deposit, such as by milling, to reduce or eliminate the portion of the protective layer disposed on the flat upper surface between grooves 311, leaving the protective layer only within grooves 311, for example, corresponding to the protective layer being disposed only in the corners, as depicted with slider 331; or the protective layer may be maintained along the entire top of wafer 301, resulting in a protective layer along the entire leading edge of slider 331 spanning the two front corners 343, in different optional configurations. Protective layers 345 disposed on the bottom corners of slider 331 may, for example, be produced by a corresponding method with a protective layer disposed on the bottom surface of wafer 301, according to one illustrative example. Slider 331 is depicted in a plan view of the air bearing surface (which may include any type of hydrodynamic bearing surface) of the slider 311, approximately corresponding to the perspective view of cross-sectional area 302, which also depicts what will become the air bearing surfaces of the nascent slider bodies 341 face up. Grooves 311 are therefore formed perpendicular to what will become the air bearing surfaces of the sliders formed from wafer 301, in accordance with this illustrative example, while a variety of other configurations may occur in other examples.

Figure 4A:
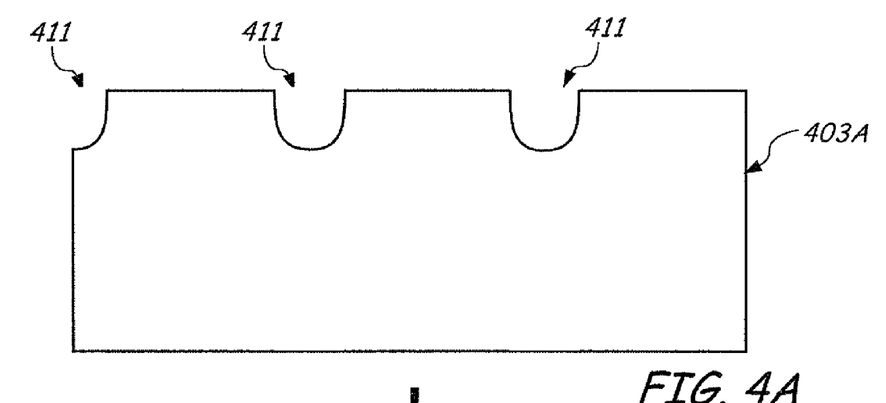
FIGS. 4A-4C depict plan views of a wafer being processed to produce a plurality of sliders, in accordance with one illustrative example.

FIG. 4A depicts a simplified plan view of a bar 403A produced from a wafer, according to another illustrative example. In this example, bar 403A includes grooves 411 that have been formed along the cutting lines for separating a bar into separate sliders, as opposed to grooves 311 in FIG. 3, in which grooves 311 are formed along the cutting lines 321 for separating the wafer 301 into separate bars. Grooves 411 are therefore formed parallel to what will later become the air bearing surfaces of the sliders, as opposed to perpendicular to the air bearing surfaces, as is the case with grooves 311 in FIG. 3. Both sets of grooves may be used alone or together with one wafer, in different examples.

Grooves 411 are formed with a concave cross-section in this illustrative example, and are depicted as relatively large compared with bar 403A, though different sizes of grooves relative to the bar may be used in different configurations. While bar 403A is depicted here in a view with only three grooves apparent, bar 403A and/or a wafer in which it is incorporated may include a series of a larger number of grooves, such as in the hundreds or thousands. The grooves 411 may be in addition to another set of grooves, and may coincide with the lines for slicing a wafer into several bars or for dicing a bar into several sliders.

Figure 4B:
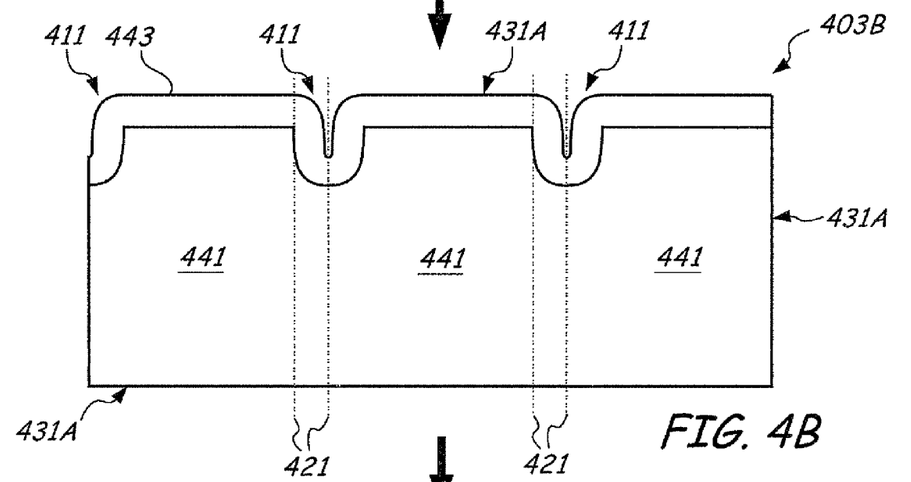

FIG. 4B depicts a simplified view plan view of a bar 403B produced from bar 403A of FIG. 4A, after a protective layer 443 has been deposited on a top surface of the bar, which will correspond to the leading edges of the sliders formed therefrom, in this illustrative example. The deposit of the protective layer 443 may be done while the bar is still incorporated as part of a larger wafer, which may be the simplest option, as in the example of FIG. 3, or after the wafer has been divided into bars, for example. The protective layer 443 fills in much of the volume of grooves 411 in bar 403B. FIG. 4B also depicts vertical cutting lines 421, with a pair of adjacent lines coinciding with each of two representative grooves, indicating the two sides of a kerf made by a saw, dicing wheel, or other cutting implement. The cutting lines 421 divide bar 403B into separate slider bodies 441, which will form the basis of sliders 441A. The kerfs are off-center relative to the grooves 411, in the interest of configuring what will become the air bearing surfaces of the sliders 41A along one face of each of the kerfs, in this illustrative example, as further described below.

The grooves 411 may be formed in the range of approximately 100-500 micrometers wide in this illustrative example, depending on factors such as the dimensions of the desired sliders, and the cutting tool may be a fraction of that width, though a variety of other dimensions higher and lower than this are also envisioned. The protective layer 443 may be deposited with a thickness that may be approximately twenty to one hundred micrometers or greater in the present example, while it may be less in other configurations, as needed to provide desired protective characteristics when accounting for other factors for a particular configuration. The grooves 411 are provided with the option of a concave cross-section in this illustrative example, which may ensure that a protective material is distributed evenly on the corners of slider bodies 441 to provide a high level of protective action with a relatively low amount of the protective material, and to provide for a configuration of varying orientations of the protective layer at various positions on the sliders in this example, as further described below.

As a particular example, bar 403B may be subject to dicing with an implement having a 120 micrometer kerf, in a process with a mechanical alignment tolerance of approximately 10 microns. An area occupied by the protective layer 443 may be desired that extends in the range of approximately 20 to 100 micrometers across, for instance. In one particular example, the protective layer 443 may be desired with a width of 50 micrometers across. The grooves 411 may then be formed to accommodate a width of 50 micrometers on either side of each groove, with room for a 120 micrometer kerf and a 10 micron tolerance in the middle, for a total groove width of 230 micrometers. This is just one particular example, while a variety of other dimensions may be used in other examples. A variety of other configurations for the grooves and deposits of the protective layer are envisioned that vary from the depiction of FIG. 4B, including with any other type or shape of surface on which the protective layer 443 is deposited. Other illustrative configurations may involve the protective layer being disposed on one of the slider bodies 441 in a layer that extends between twenty and 100 micrometers from one of the corners along a first edge of the slider body 441, such as coinciding with the top surface of the slider bodies on which the major portion of the protective layer 443 is deposited, and that extends between twenty and 100 micrometers from the corner of the slider body 441 along a second edge of the slider body, such as in the direction along one of the grooves 411 and the cutting lines 421, in an illustrative example. The protective layer may also be disposed on a continuous portion of the slider body 441 that includes at least two corners of the slider body, and an edge of the slider body extending between the at least two corners, such as along the top surface of the slider body between two adjacent grooves 411, in another illustrative configuration.

Figure 4C:
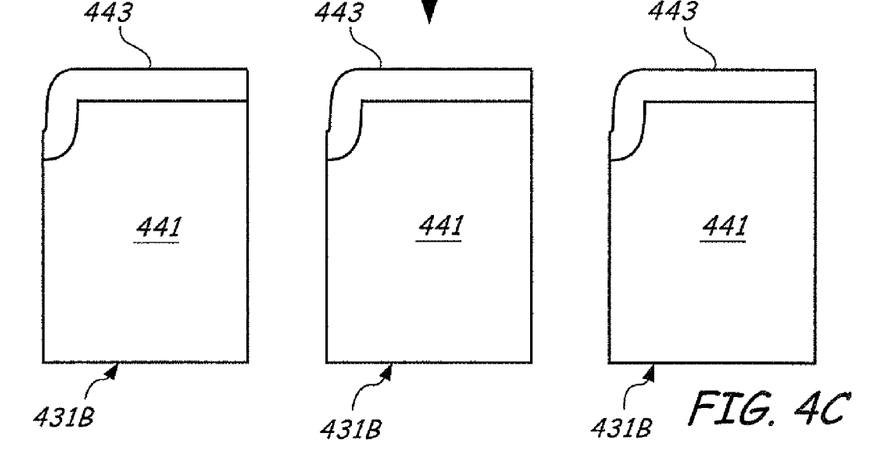

FIG. 4C depicts sliders 431B as the form taken by sliders 431A of FIG. 4B after the cutting implement has been employed along cutting lines 421 to separate the bar 403B into the separate sliders 431B. Each of the illustrative sliders 431B includes one of the slider bodies 441 and a protective layer 443, in this illustrative example.

Figure 5A:
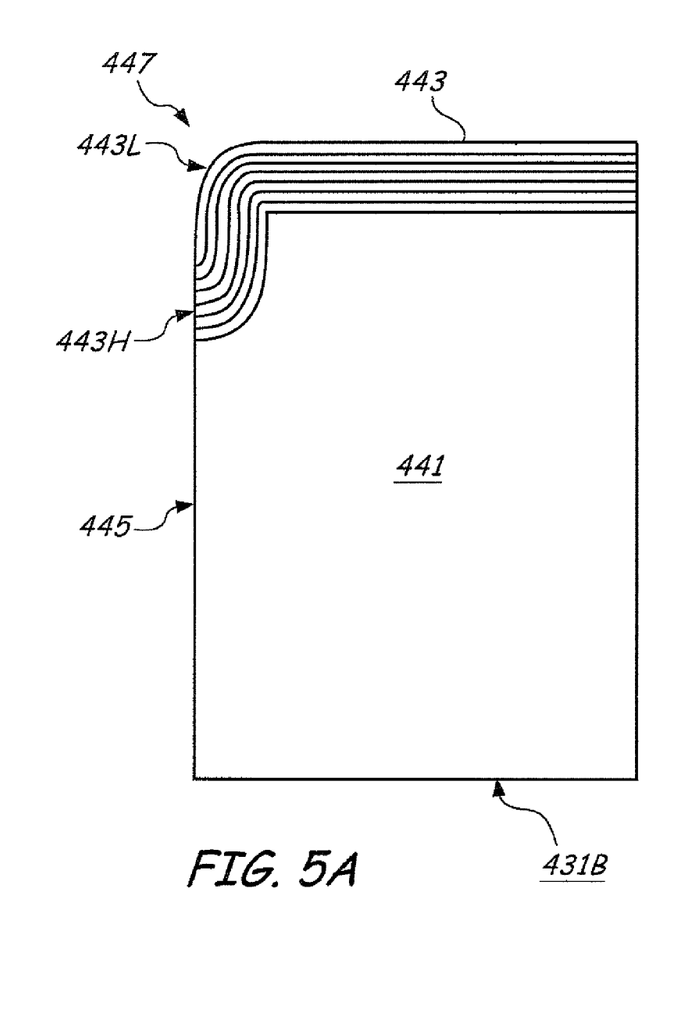
FIGS. 5A-5B depict plan views of a slider in different steps of processing, in accordance with one illustrative example.

FIG. 5A provides a closer depiction of one of sliders 431B, after its air bearing surface 445 (which may correspond to any hydrodynamic bearing surface) may have been further treated and smoothed, such as by lapping. FIG. 5A also depicts a pattern of striation running generally parallel to the locally underlying slider body surface in protective layer 443. This striation indicates that protective layer 443 may have heterogeneous properties in one orientation, generally parallel to the underlying slider body surface, as opposed to another orientation generally perpendicular to the underlying slider body surface. The depicted striation may correspond generally to a series of individual layers of deposition of the protective layer, where the protective layer has different properties within the plane of a layer of deposition as it does between layers of deposition. Pyrolytic carbon is one illustrative example of a material that may be used advantageously for protective layer 443, which may be deposited with one elastic modulus in one orientation and a significantly different elastic modulus in a second orientation.

For example, the protective layer 443 may have a different elastic modulus in these different orientations such that it has a first elastic modulus running parallel to the plane of deposition, and a second, significantly different elastic modulus going perpendicular to the plane of deposition. Because of the concave curvature of the groove 411 that formed the shape of the corner 447 of slider 431B, and the cut through the protective layer at what had been the bottom of the groove 411 which now forms the lower edge of the protective layer at corner 447, the underlying deposition layers run parallel to the surface of protective layer 443 over most of the protective layer 443 on slider 431B, including at protective region 443L at corner 447, while the underlying deposition layers are rotated relative to the surface to become perpendicular to the surface of protective layer 443 at a protective region 443H set at a displacement from corner 447 along air bearing surface 445. Protective regions 443L and 443H are different portions of the protective layer 443, which may have different protective characteristics.

This difference in orientation of the deposition layers provides one example of the protective layer 443 having a first elastic modulus at protective region 443L at corner 447, and a second elastic modulus at a protective region 443H displaced from corner 447. The second elastic modulus, at the displaced protective region 443H, may be higher than the first elastic modulus, at the corner protective region 443L, so that the "H" and "L" in reference labels 443H and 443L refer to "high" and "low" elastic modulus, for portions of protective layer 443 with a relatively high elastic modulus and with a relatively low elastic modulus, respectively. The first elastic modulus may illustratively be lower than ten gigapascals, while the second elastic modulus may be higher than ten gigapascals, for instance. In one illustrative example, the first elastic modulus may be lower than one gigapascal, and the second elastic modulus may be between fifteen and twenty-five gigapascals, while the slider body 441 may have an elastic modulus that is higher than 200 gigapascals, for instance.

Figure 5B:
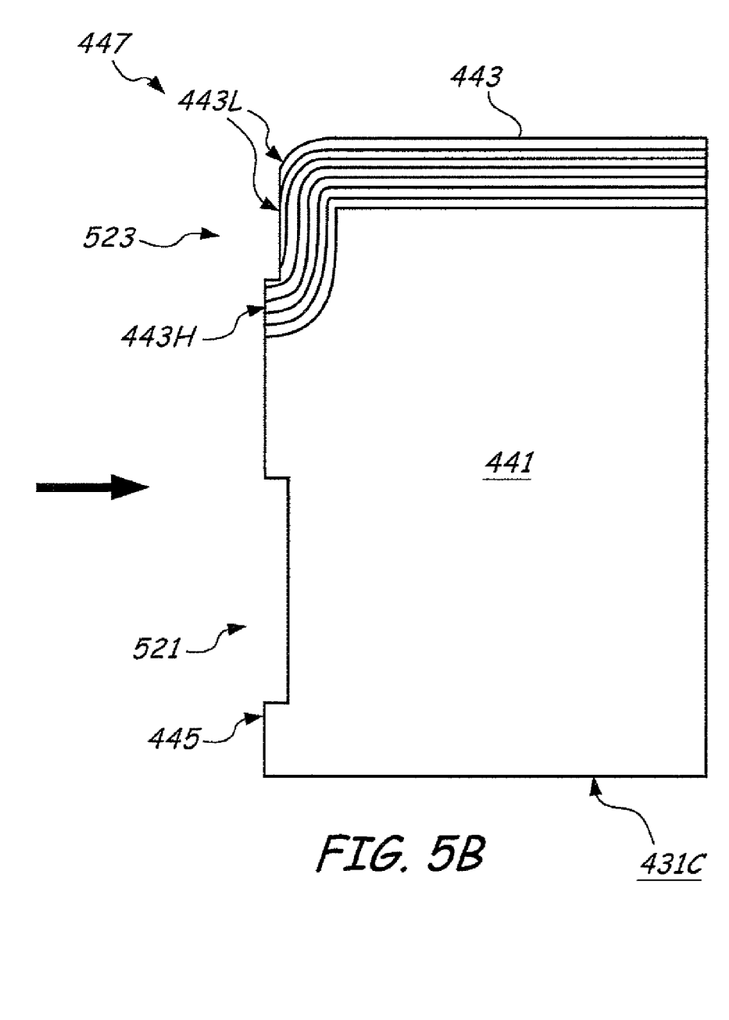

FIG. 5B depicts slider 431B after it has been further processed to take the form of slider 431C, by the addition of certain new features including illustrative recessed surface 523 formed in the vicinity of corner 447, and illustrative recessed surface 521 formed in air bearing surface 445. The recessed surface features 521, 523, may illustratively be formed by milling, lapping, or another process. Protective region 443L may therefore be disposed on recessed surface 523 at one height relative to the air bearing surface 445, while protective region 443H may be disposed at a different, greater height relative to the air bearing surface 445, in this illustrative example. Air bearing surface 445 may form a hydrodynamic bearing surface, such as an air bearing surface, for example. The recessed surface 521 at corner 447 may provide advantageous contact characteristics for slider 431C in combination with the protective layer 443, which has a low elastic modulus protective region 443L at recessed surface 521 at the corner 447 and a relatively higher elastic modulus at the displaced protective region 443H spaced away from corner 447 along air bearing surface 445.

This illustrative configuration provides advantageous contact characteristics for slider 431C as follows, in one illustrative aspect. The slider 431C may be incorporated in a larger system, in which slider 431C is suspended in close proximity above a moving opposing surface, such as a media surface in a data storage system in one illustrative example, that faces air bearing surface 445. A mechanical disturbance such as a shock event may temporarily cause a forced contact between slider 431C and the opposing surface. The first point of contact between the slider 431C and an opposing surface in such a situation is understood to be at a corner of the slider 431C, particularly at a corner of the air bearing surface 445, such as illustrative corner 447. Corner 447 is illustrative of any or all of the corners of air bearing surface 445 or of slider 431C, which may also have a configuration similar or comparable in some aspects to corner 447 as depicted in FIG. 5B. In the present illustrative example, that initial contact therefore takes place at a protective region 443L in a portion of the protective layer 443 of relatively low elastic modulus, much lower than the elastic modulus of the slider body 441 itself. Therefore, the impact of this contact is greatly cushioned relative to a traditional slider without the features particularly described and depicted herein, and is less likely to damage or negatively affect the opposing surface or the slider 441 or the proper functioning of these components.

Additionally, after the initial impact, the slider 431C may move toward leveling out relative to the opposing surface, which may proceed while contact with the opposing surface may be repeating or continuing. In this situation, the slider 431C may roll to engage the protective region 443H of the protective layer 443 with the opposing surface. Protective region 443H has an elastic modulus that is high relative to that of protective region 443L, but that is also still lower than the elastic modulus of slider 431C, in this illustrative example. Protective region 443H at a displacement from corner 447 may therefore still provide superior cushioning and less risk of damage than a direct contact between the harder slider body 441 and the opposing surface, which may take place after the initial contact with protective region 443L absorbs most of the force of the impact. The relatively higher elastic modulus of protective region 443H also makes it much more likely to recoil and rebound from a contact with the opposing surface, more effectively than would the softer protective region 443L, thereby promoting a rebound of the entire slider 431C away from the opposing surface before the rolling or leveling action of the slider 431C is able to proceed further and bring the much harder air bearing surface 445 into direct contact with the opposing surface. Protective regions 443L and 443H therefore act in concert to provide a series of protective responses for slider 431C, to mitigate the likelihood or unwanted effect of any contact event between slider 431C and an opposing surface.

Protective layer 443 or portions thereof may also include a tribological coating, that helps maintain protective layer 443 despite repeated contact events. The tribological coating may be disposed over the surface of protective layer 443, for example. The tribological coating may be composed of or may include diamond-like carbon (DLC), as one illustrative example of an advantageous material for this function.

It is to be understood that even though numerous characteristics and advantages of various aspects of the present disclosure have been set forth in the foregoing description, together with details of the structure and function of various configurations of the disclosure, this disclosure is illustrative only, and changes may be made in details, including in matters of structure and arrangement of parts within the principles of the present disclosure to the full extent indicated by the broad general meaning of the terms in which the appended claims are expressed. For example, a slider or a fabricating process of the present disclosure may be used in association with any technology for the storage and/or manipulation of data, including those involving magnetoresistance, giant magnetoresistance, colossal magnetoresistance, flash memory, optics, magneto-optics, photonics, spintronics, holography, and any other technology. In addition, the present disclosure is not limited to systems for storage or manipulation of data, but may also involve any technology for operating components in close proximity to and at a high speed of motion relative to an adjacent surface.

What is claimed is:

1. A slider comprising:
a slider body having a first side; and
a protective layer disposed on a portion of the first side of the slider body comprising at least one corner of the slider body, the protective layer positioned to contact a surface opposing the slider at the at least one corner and at a position displaced from the at least one corner, the protective layer disposed on the first side of the slider body in a first orientation generally parallel to an underlying slider body surface at the at least one corner such that the protective layer has a first elastic modulus at the at least one corner, and the protective layer disposed on the first side of the slider body in a second orientation generally perpendicular to the underlying slider body surface at the position displaced from the at least corner such that the protective layer has a second elastic modulus at the position displaced from the at least one corner, wherein the second elastic modulus is higher than the first elastic modulus.

2. The slider of claim 1, wherein the slider body comprises a hydrodynamic bearing surface on the first side of the slider body, and the protective layer is disposed on one or more portions of the first side of the slider body comprising four corners of the hydrodynamic surface, the protective layer having the first elastic modulus at each of the four corners, and the second elastic modulus at positions displaced from each of the four corners.

3. The slider of claim 1, wherein the protective layer is disposed on the slider body in a layer that is at least twenty micrometers across.

4. The slider of claim 3, wherein the protective layer is disposed on the slider body in a layer that extends between twenty and 100 micrometers from the corner along a first edge of the slider body, and that extends between twenty and 100 micrometers from the corner along a second edge of the slider body.

5. The slider of claim 1, wherein the protective layer is disposed on a continuous portion of the slider body that includes at least two corners of the slider body, and an edge of the slider body extending between the at least two corners.

6. The slider of claim 1, wherein the protective layer comprises pyrolytic carbon.

7. The slider of claim 1, wherein the first elastic modulus is lower than ten gigapascals, and the second elastic modulus is higher than ten gigapascals.

8. The slider of claim 7, wherein the first elastic modulus is lower than one gigapascal, the second elastic modulus is between fifteen and twenty-five gigapascals, and the slider body has an elastic modulus that is higher than 200 gigapascals.

9. The slider of claim 1, wherein at the first side one face of the slider body defines a hydrodynamic bearing surface, and wherein the at least one corner, where the protective layer has the first elastic modulus, is disposed at a first height relative to the hydrodynamic bearing surface; and the position displaced from the at least one corner, where the protective layer has the second elastic modulus, is disposed at a second height that is higher relative to the hydrodynamic surface than the first height.

10. The slider of claim 1, further comprising a tribological coating disposed over the protective layer.

11. The slider of claim 10, wherein the tribological coating comprises diamond-like carbon.

12. A slider comprising:
a slider body having a first side; and
a protective material disposed in deposition layers on a portion of the first side of the slider body comprising at least one corner of the slider body, the protective material positioned to contact a surface opposing the slider at the at least one corner and at a position displaced from the at least one corner, the deposition layers of the protective material disposed on the portion of the first side of the slider body substantially parallel to a surface of the protective material at the at least one corner such that the protective material has a first elastic modulus at the at least one corner, and the deposition layers of the protective material disposed on the portion of the first side of the slider body substantially perpendicular to the surface of the protective material at the position displaced from the at least corner such that the protective material has a second elastic modulus at the position displaced from the at least one corner, wherein the second elastic modulus is higher than the first elastic modulus.

13. The slider of claim 12, wherein the slider body comprises a hydrodynamic bearing surface on the first side of the slider body, and the protective material is disposed on one or more portions of the first side of the slider body comprising four corners of the hydrodynamic surface, the protective material having the first elastic modulus at each of the four corners, and the second elastic modulus at positions displaced from each of the four corners.

14. The slider of claim 12, wherein the protective material is disposed on the slider body at least twenty micrometers across.

15. The slider of claim 14, wherein the protective material is disposed on the slider body such that the protective material extends between twenty and 100 micrometers from the corner along a first edge of the slider body, and such that the protective material extends between twenty and 100 micrometers from the corner along a second edge of the slider body.

16. The slider of claim 12, wherein the protective material is disposed on a continuous portion of the slider body that includes at least two corners of the slider body, and an edge of the slider body extending between the at least two corners.

17. The slider of claim 12, wherein the protective material comprises pyrolytic carbon.

18. The slider of claim 12, wherein the first elastic modulus is lower than ten gigapascals, and the second elastic modulus is higher than ten gigapascals.

19. The slider of claim 18, wherein the first elastic modulus is lower than one gigapascal, the second elastic modulus is between fifteen and twenty-five gigapascals, and the slider body has an elastic modulus that is higher than 200 gigapascals.

* * * * *